United States Patent [19]

Johnson

[11] 4,037,620

[45] July 26, 1977

[54] CONTROLLER FOR FLUID PRESSURE OPERATED DEVICES

[75] Inventor: Oliver Wendell Johnson, Chaska, Minn.

[73] Assignee: Eaton Corporation, Cleveland, Ohio

[21] Appl. No.: 699,147

[22] Filed: June 23, 1976

Related U.S. Application Data

[63] Continuation-in-part of Ser. No. 679,607, April 23, 1976, which is a continuation of Ser. No. 507,015, Sept. 18, 1974, abandoned.

[51] Int. Cl.² ............................................. B62D 5/08
[52] U.S. Cl. ................................... 137/596; 60/384; 91/412; 91/446; 91/467; 180/132; 418/61 B
[58] Field of Search ...................... 60/384, 386, 402; 91/375 R, 412, 446, 467; 137/596, 596.13, 625.24; 180/132; 418/61 B

[56] References Cited

U.S. PATENT DOCUMENTS

| | | | |
|---|---|---|---|
| 3,911,942 | 10/1975 | Becker | 137/596.13 X |
| 3,960,234 | 6/1976 | Morgan | 180/132 |
| 3,996,838 | 12/1976 | Goff | 137/110 X |

Primary Examiner—Alan Cohan
Assistant Examiner—Gerald A. Michalsky
Attorney, Agent, or Firm—Teagno & Toddy

[57] ABSTRACT

A controller for fluid pressure operated devices such as hydrostatic power steering systems. The controller is of the type having a primary, rotatable valve member and a follow-up valve member, and further comprising a fluid meter including a metering member coupled to the follow-up valve member. The controller is of the 5-port type, having a load signal port for communicating a steering load signal and maintaining a constant pressure drop across the main control orifice of the controller. The primary and follow-up valve members define a central reference plane oriented generally perpendicular to the axes of rotation of the valve members and the various ports and passages defined by the valve members are arranged in somewhat of a mirror image of each other about the reference plane. The follow-up valve member (sleeve) includes a pair of load sensing orifices, intersected by the reference plane, and disposed to communicate to the load signal port of the controller a pressure signal from immediately downstream of the main control orifice, for either direction of relative displacement of the primary and follow-up valve member. When the valve members are in the neutral position, the load sensing orifice communicates with a drain port in the primary valve member to relieve to tank the fluid in the load sensing circuit.

19 Claims, 5 Drawing Figures 4,037,620

CONTROLLER FOR FLUID PRESSURE OPERATED DEVICES

This is a continuation-in-part application of U.S. application Ser. No. 679,607, filed Apr. 23, 1976, which is a continuation of U.S. application Ser. No. 507,015, filed Sept. 18, 1974, now abandoned.

BACKGROUND OF THE DISCLOSURE

The present invention relates to a controller for fluid pressure operated devices, and more particularly, to a controller which is capable of providing a load signal to an external control mechanism, wherein the controller has an improved spool-sleeve valve arrangement.

Although the present invention is equally adaptable to any controller for fluid pressure operated devices wherein the controller utilizes a spool-sleeve valve arrangement, it is especially advantageous when used in controllers for power steering systems of the type commonly employed in off-the-road vehicles, and will be described in connection therewith. More specifically, although the invention will be described in connection with rotatable spool-sleeve valve arrangements, it will be appreciated that the invention may also be utilized with valving which operates in response to axial movement.

A controller for a power steering system of the type to which the present invention pertains is described in U.S. Pat. No. Re. 25,126, assigned to the assignee of the present invention. Controllers of the type disclosed in the cited reissue patent have become well known in the art and generally comprise a housing having an inlet and an outlet and a pair of control fluid ports, feeding a power steering cylinder. The vehicle steering wheel is directly connected to the controller and when in the neutral (non-rotating) position, fluid may pass from the inlet through the valve to the outlet (open center system), or fluid from the inlet may be blocked from passing through the valve (closed center system).

When the steering wheel is rotated in one direction from the neutral position, the valve is displaced and fluid flows from the inlet through the valve, to the meter, then to one of the control fluid ports to move the power steering cylinder. When the steering wheel is rotated in the opposite direction, the valve rotates in the opposite direction and fluid flows from the inlet port through the valve, then through the fluid meter in the opposite direction, then to the other of the control fluid ports to move the power steering cylinder in the opposite direction.

Conventionally, controllers of the type described have utilized rotary spool-sleeve valves to direct the flow of fluid from the inlet port in accordance with the rotational position of the steering wheel. In general, rotary spool-sleeve valves comprise a primary valve member (spool) connected directly to the steering wheel and a follow-up valve member (sleeve) surrounding the spool. Axially adjacent the spool and sleeve is a fluid meter, generally a gerotor having an externally toothed member orbiting within an internally toothed member. The externally toothed member is splined to a drive shaft, at the opposite end of which the drive shaft is coupled to the sleeve, such as by a pin passing therethrough. When the spool is rotated, fluid is permitted to flow to the meter, causing the externally toothed member to orbit and rotate, thus imparting rotary follow-up movement to the sleeve by means of the drive shaft. Generally, the sleeve has a plurality of orifices extending radially therethrough and the spool has a plurality of axially extending grooves on its outer surface to provide communication between certain of the orifices in the sleeve.

One of the problems associated with the conventional power steering systems and the controllers used therein is steering wheel "precession", i.e., the position of the steering wheel corresponding to the neutral position of the controller "precesses" or moves slowly in one direction or the other during operation of the system. It is believed that this is caused primarily by imbalance in the fluid flow paths, i.e., the fluid is subjected to a longer path and/or more flow restriction for one direction of steering than for the other. Among the other problems associated with systems and controllers of the type described is internal leakage, primarily between "metered" fluid and "return" fluid. As used herein, the term metered fluid refers to fluid which has been measured by the fluid meter and is then fed to the power steering cylinder. The term return fluid refers simply to fluid displaced by the movement of the power steering cylinder which returns to the valve and passes to the outlet port (or tank port). While the above definitions are strictly true only for a controller in which the flow order is: inlet port — fluid meter — cylinder — outlet port, it will be apparent that the invention is equally adapted for controllers having other flow orders, including but not limited to: inlet port — cylinder — fluid meter — outlet port. In connection with the definitions of metered and return fluids for any particular controller, it should be noted that the remainder of the fluid passing through the spool-sleeve valve is at approximately the same pressure as the metered fluid, but has not been metered and hence, may be referred to as "non-metered" fluid.

In many of the conventional spool-sleeve valve arrangements, the orifices in the sleeve communicating to and from the control fluid ports and the grooves in the spool communicating therewith are arranged in such a manner that grooves containing metered fluid and grooves containing return fluid are in an alternating, interdigitated relationship with each other, thus greatly increasing the length of the interface between metered and return fluid and the opportunity for internal leakage therebetween (see, for example, U.S. Pat. No. 3,819,307).

SUMMARY OF THE INVENTION

Accordingly, it is an object of the present invention to provide a controller for fluid pressure operated devices and a spool-sleeve valve arrangement therefor which overcome the abovementioned problems.

It is a more specific object of the present invention to provide a controller for a power steering system which minimizes steering wheel precession through improved design of the spool-sleeve valve arrangement.

It is an even more specific object of the present invention to provide a spool-sleeve configuration for a controller having a substantially symmetrical fluid flow path in either direction or rotation of the valve.

It is another object of the present invention to provide a valve arrangement for use in a controller of the class described which reduces internal leakage by reducing the length of the interface between metered and return fluid, and between metered and non-metered fluid.

It is a more specific object of the present invention to provide a spool-sleeve valve arrangement in which the metered and return fluids are maintained axially separated.

It is also an object of the present invention to provide a controller and spool-sleeve valve arrangement therefore capable of achieving the above-stated objects and, in addition, providing a load sensing orifice adapted to communicate a load pressure signal in either direction of operation of the controller.

The above and other objects of the present invention are accomplished by the provision of an improved controller for fluid pressure operated devices. The controller comprises a housing and valve means disposed therein including a primary, rotatable valve member and a cooperating, relatively rotatable follow-up valve member, the valve members defining a neutral position relative to each other. The follow-up valve member is coupled to the primary valve member for limited movement relative to the neutral position. The controller includes a fluid meter having a metering member which is coupled to the follow-up valve member for imparting follow-up movement thereto. The controller includes an inlet port, an outlet port, first and second control fluid ports for connection to a fluid pressure operated device, and a load sensing port for connection to a means operable to vary the fluid pressure at the inlet port. The primary and follow-up valve members cooperate with the housing to define a first fluid passage connecting the inlet port in fluid communication with the first control fluid port when the valve members are relatively displaced in one direction from the neutral position, the first fluid passage including the fluid meter. The primary and follow-up valve members cooperate with the housing to define a second fluid passage connecting the inlet port in fluid communication with the second control fluid port when the valve members are relatively displaced in the other direction from the neutral position, the second fluid passage including the fluid meter. The first and second fluid passages are constructed and arranged to provide substantially the same restriction to fluid flow between the inlet port and the first and second control fluid ports, respectively, for the same relative displacement of the valve members from the neutral position in the one and the other directions, respectively. The follow-up valve member in the housing cooperate to define a load sensing passage in continuous fluid communication with the load sensing port and disposed to communicate with the first fluid passage when the valve members are relatively displaced in the one direction and with the second fluid passage when the valve members are relatively displaced in the other direction.

DESCRIPTION OF THE PREFERRED EMBODIMENT

Figure 1:
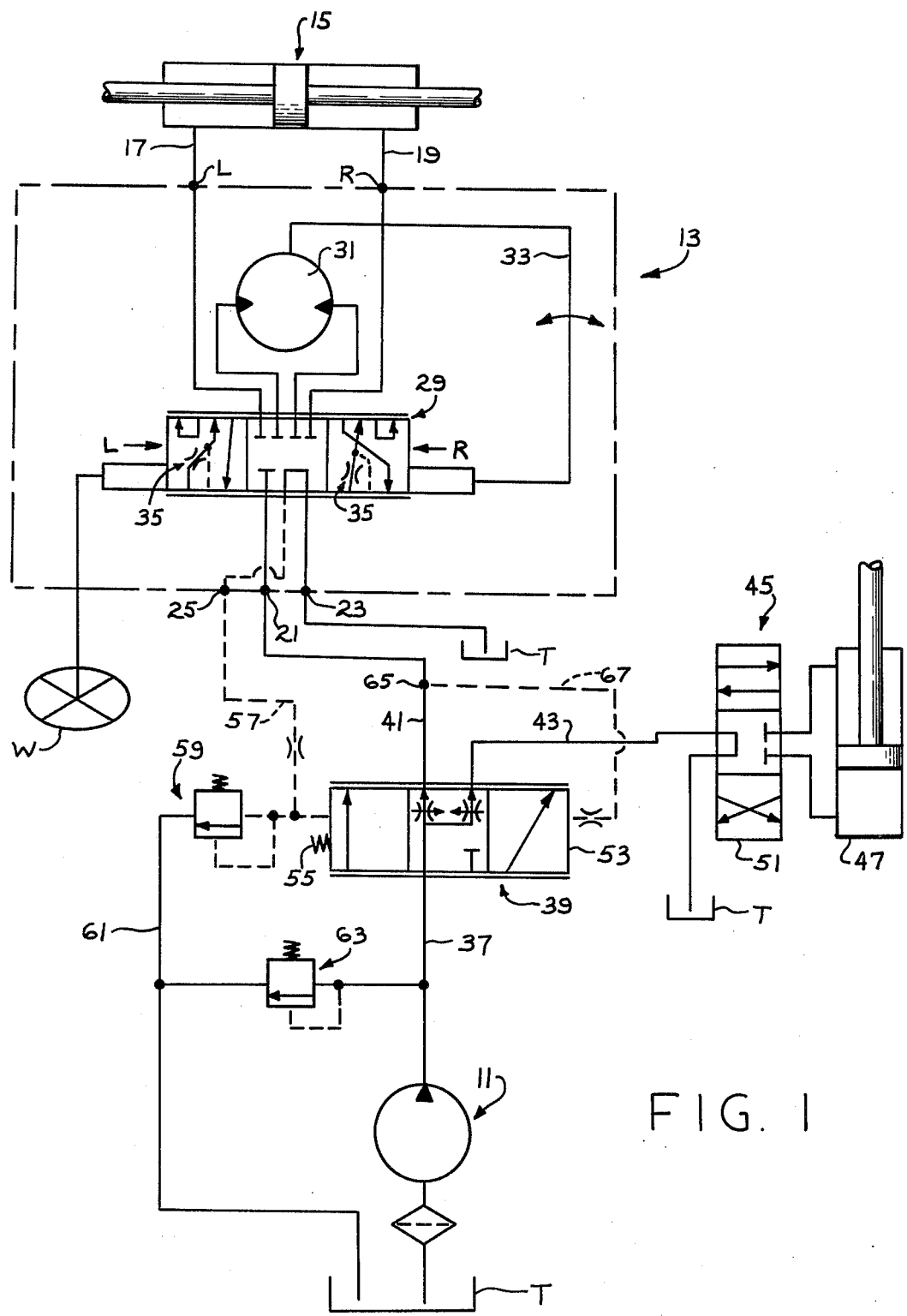
FIG. 1 is a hydraulic schematic of a vehicle power steering system and controller to which the present invention may be applied.

Referring now to the drawings, which are not intended to limit the present invention, FIG. 1 illustrates schematically a hydrostatic power steering system including a fixed displacement pump 11 which provides hydraulic fluid at a constant flow and variable pressure to a steering control valve, generally designated 13. Steering control valve 13 controls the flow and direction of pressurized fluid fed to a steering cylinder 15 for steering control of a pair of ground-engaging wheels (not shown).

The steering control valve 13, which may be of the general type well known in the art, such as is illustrated in U.S. Pat. No. Re. 25,126 (assigned to the assignee of the present invention and incorporated herein by reference), includes a left fluid port L and a right fluid port R which are connected to the opposite ends of the steering cylinder 15 by a pair of fluid conduits 17 and 19, respectively. The steering control valve 13 further includes a fluid inlet port 21, a fluid return port 23, and a load signal port 25. Disposed within the steering control valve 13 is a valving arrangement, generally designated 29, which is movable from its neutral position shown in FIG. 1 to either a right turn position R or a left turn position L.

When the valving arrangement 29 is in either of the turn positions, the pressurized fluid passing through the valving 29 flows through a fluid meter 31, the function of which is to measure the proper amount of fluid to be fed to the appropriate fluid port L or R. As is well known in the art, the fluid meter 31 is typically connected to the valving arrangement 29 by means of a mechanical follow-up 33.

In either of the turn positions, the valving 29 defines a variable orifice 35, the flow area of which is generally proportional to the deflection of the valving 29. Therefore, the rate of rotation of the steering wheel W determines the valve deflection and the rate of flow of fluid through the variable orifice 35 and eventually, to the steering cylinder 15.

The output of the fixed displacement pump 11 is fed by means of a fluid conduit 37 to a pilot-operated flow control valve, generally designated 39, and substantially all of the output fluid from the pump 11 passes through the flow control valve 39. In its centered position, the flow control valve 39 provides a variably restricted flow, by means of a fluid conduit 41, to the inlet port 21 of the steering control valve 13 and also provides a variably restricted flow, by means of a fluid conduit 43, to an auxiliary fluid circuit, generally designated 45. The auxiliary circuit 45 may include various types of hydraulic components, in any desired degree of complexity, but for purposes of illustration, the circuit 45 includes a fluid cylinder 47 controlled by a conventional three-position, four-way flow control valve 51 which is shown in FIG. 1 as an open-center valve to match the fixed displacement pump 11. The flow control valve 39 includes a valve member 53 which is biased by means of a spring 55 toward a position permitting substantially all of the fluid in fluid conduit 37 to pass to fluid conduit 41. Immediately downstream of the variable orifice 35 a fluid pressure signal is communicated to the load signal port 25 from where it is communicated by means of a load signal line 57, through a damping orifice, to bias the valve member 53 in the same direction as does the spring 55. The load signal line 57 also communicates with a steering system relief valve 59, the outlet side of which is communicated by fluid conduit 61 back to tank. The steering relief valve 59 protects the steering system by guarding against undesirable pressure buildups therein, while a main system relief valve 63, connected in parallel between fluid conduits 37 and 61, protects the overall system against excessive pressure buildups.

At a point, designated 65, disposed between the fluid inlet port 21 and the flow control valve 39, a pressure signal is communicated to the flow control valve 39 by means of a pilot signal line 67 to exert a biasing force on the valve member 53, acting in opposition to that exerted by spring 55. It will be appreciated that the use of the signal lines 57 and 67 to communicate pressure signals from immediately downstream and upstream, respectively, of the variable orifice 35, provides opposing pressure signals across the valve member 53, the difference between the pressure signals exerting a biasing force approximately equivalent to that exerted by the spring 55.

Figure 3:
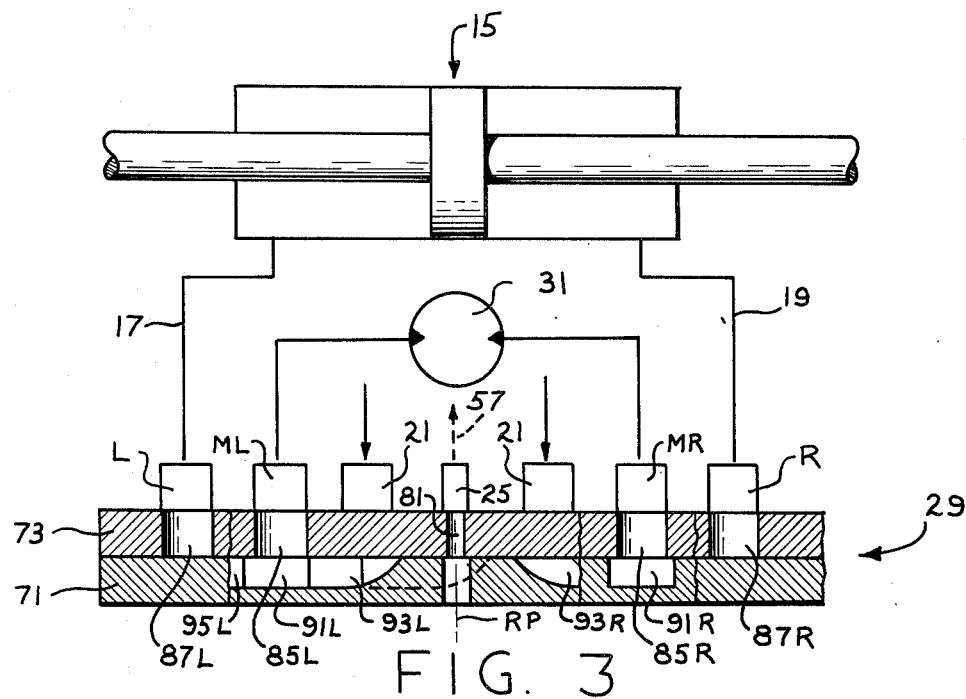
FIG. 3 is a semi-schematic cross-section taken on line 3—3 of FIG. 2.
Figure 5:
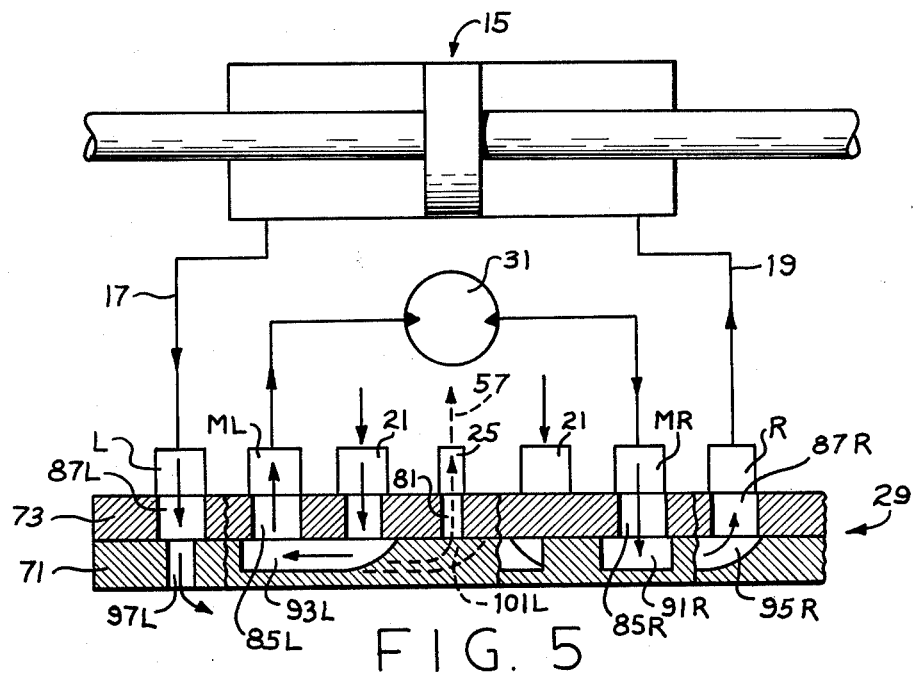
FIG. 5 is a semi-schematic cross-section taken on line 5—5 of FIG. 4.
Figure 4:
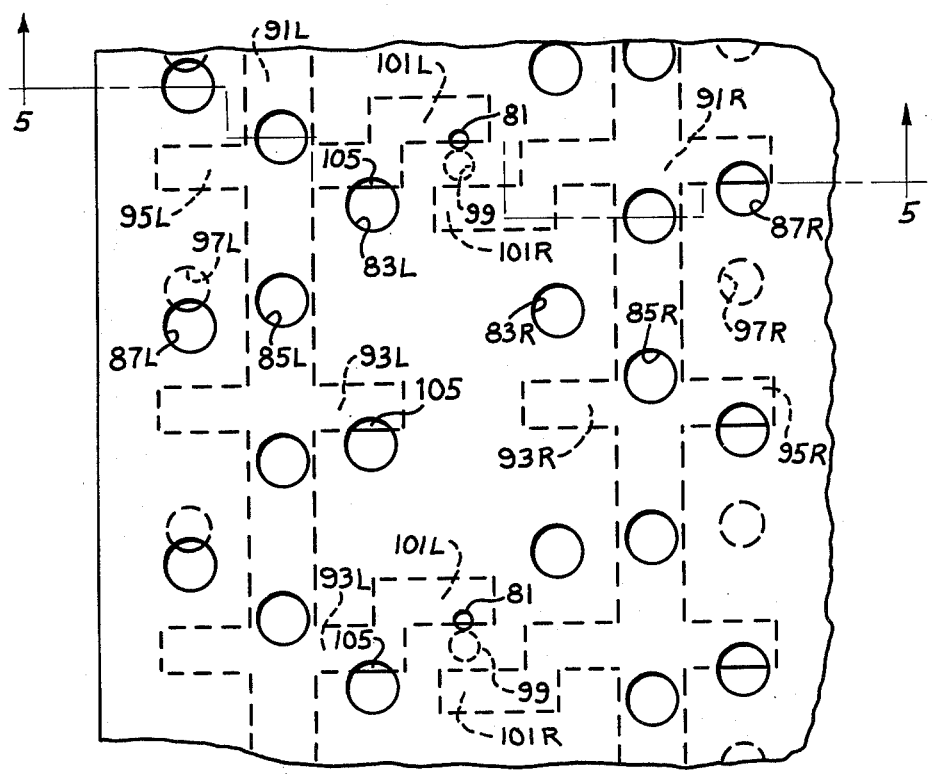
FIG. 4 is a fragmentary, overlaying view of the valve members of the present invention, illustrating a right turn condition.

The essential features of the present invention reside primarily in the configuration of the valving arrangement 29. Various other details of the construction and operation of the steering control valve 13, which form no part of the present invention, may be better understood by reference to the above-incorporated U.S. Pat. No. Re. 25,126. Referring now to FIGS. 2 through 5, there is shown, somewhat schematically, the details of the valving arrangement 29 in the neutral position (FIGS. 2 and 3), and in the right-turn position (FIGS. 4 and 5).

The valving arrangement 29 comprises a primary, rotatable valve member (spool) 71, and a cooperating, relatively rotatable follow-up valve member (sleeve) 73. The general operating relationship of the spool 71 and sleeve 73, as well as certain additional construction details which are irrelevant to the present invention, may be better understood by reference to the above-incorporated U.S. Pat. No. Re. 25,126. In connection with the subsequent description of the spool 71 and sleeve 73, as well as the flow patterns therethrough, it should be noted that many of the apertures, orifices, passages, etc. are arranged in a mirror image with respect to a central reference plane RP, which for purposes of clarity is shown only in FIGS. 2 and 3, although it will be understood that the previously mentioned symmetry with respect to the reference plane RP is of at least equal significance in connection with the turn positions, as illustrated in FIGS. 4 and 5. Thus, such elements will be described by a reference numeral, followed by either an R or L to indicate that the particular element is located on the right side or the left side, respectively, of the central reference plane RP. On the other hand, certain of the elements do not have a corresponding element oppositely disposed about the reference plane RP and will be referred to by use of a reference numeral alone.

It will be noted from a review of the above-incorporated U.S. Pat. No. Re. 25,126 that, typically, certain sets of ports or orifices arranged circumferentially about the valve sleeve 73 may all be in continuous fluid communication with each other and with a single passage or fluid port formed in the housing of the steering control valve 13, by means of a circumferential groove formed on the surface of the valve sleeve 73. However, for purposes of simplifying the valve overlay views (FIGS. 2 and 4), such annular collector grooves have not been shown, but it will be apparent to those skilled in the art where such collector grooves are necessary and that such grooves may be formed either on the outer surface of the valve sleeve 73 or on the inner surface of the housing bore within which the valve sleeve 73 rotates.

Formed in the valve sleeve 73 is a pair of load sensing orifices 81 which, in the subject embodiment, are positioned 180 degrees apart and are intersected by the central reference plane RP. The function of the load sensing orifices will be described in greater detail in connection with FIGS. 4 and 5.

Oppositely disposed about the reference plane RP are a plurality of pressure ports 83L and a plurality of pressure ports 83R, all of the pressure ports 83L and 83R being in continuous fluid communication with the fluid inlet port 21. Disposed further from the reference plane RP is a plurality of meter ports 85L and a plurality of meter ports 85R. As is well known in the art, the meter ports 85L are in fluid communication with either the expanding volume chambers or the contracting volume chambers of the fluid meter 31, by means of one or more meter passages designated ML (see FIG. 3). Similarly, the meter ports 85R are in fluid communication with the other of the expanding volume chambers or contracting volume chambers of the fluid meter 31 by means of one or more fluid passages MR.

The valve sleeve 73 also defines a plurality of operating ports 87L which are in continuous fluid communication with the left fluid port L, and a plurality of operating ports 87R which are in continuous fluid communication with the right fluid port R. It should be noted that in the subject embodiment, for each of the pluralities of ports, the circumferential spacing from one port to the next is substantially the same, there being four each of the pressure ports 83L, pressure ports 83R, operating ports 87L and operating ports 87R, and six each of the meter ports 85L and meter ports 85R. It should be appreciated that the numbers presented are by way of example only and the scope of the present invention is in no way intended to be limited thereby.

Figure 2:
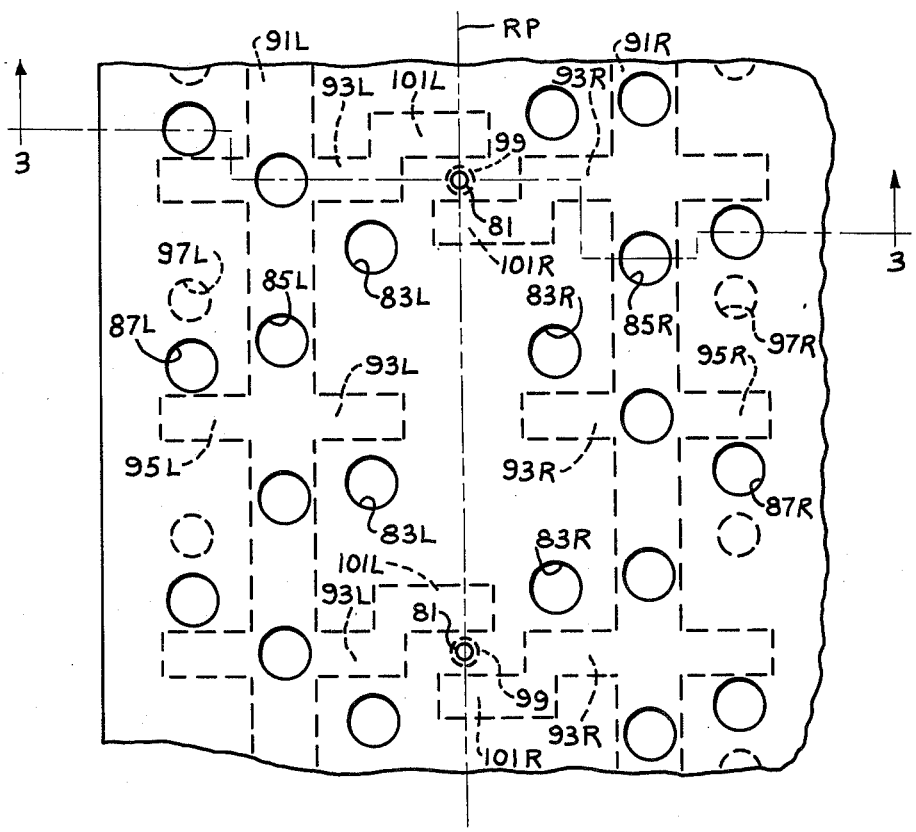
FIG. 2 is a fragmentary, overlaying view of the valve members of the present invention, illustrating the neutral condition.

The valve spool 71 has formed on its outer surface a pair of circumferential meter grooves 91L and 91R which are equally and oppositely disposed about the reference plane RP. It should be noted that when the valve sleeve 73 is disposed about the valve spool 71, the sleeve 73 and spool 71 will be in the same axial relationship as is shown in FIGS. 2 and 3. Thus, the meter grooves 91L and 91R are axially aligned with, and in fluid communication with meter ports 85L and 85R, respectively. Extending axially inwardly (toward the reference plane RP) from the meter grooves 91L and 91R are pluralities of circumferentially spaced-apart passages 93L and 93R, respectively, which are adapted to communicate with the pressure ports 83L and 83R when the valve sleeve 73 and valve spool 71 are rotationally displaced from the neutral position shown in FIG. 2 in opposite directions. Extending axially outwardly from the meter grooves 91L and 91R are pluralities of operating passages 95L and 95R, respectively, each of which, in the subject embodiment, is aligned with a passage 93L or 93R. Therefore, in one direction of relative rotation of the spool 71 and sleeve 73, each of the operating ports 87L is in fluid communication with the adjacent operating passage 95L, while in the opposite direction of relative rotation of the spool 71 and sleeve 73, each of the operating ports 87R communicates with the adjacent operating passage 95R.

As was noted in connection with the sleeve 73, the individual passages comprising each of the above-described pluralities of passages preferably have uniform circumferential spacing therebetween, the circumferential spacing between the passages preferably being the same as that between the associated port of the sleeve 73. In addition to the above-described passages formed on the outer surface of the valve spool 71, there is a plurality of tank ports 97L and a plurality of tank ports 97R, the tank ports 97L and 97R being oppositely disposed about the reference plane RP and axially spaced therefrom an appropriate distance to permit communication with the operating ports 87L and 87R, respectively. As is well known in the art, each of the tank ports 97L and 97R communicate return fluid to the interior of the valve spool 71, from where it flows to the return port 23 (shown only in FIG. 1), and then to tank. Also communicating with the interior of the valve spool 71 and the return port 23 is a pair of drain ports 99, formed in the valve spool 71 and in the neutral position shown in FIG. 2, positioned to be in fluid communication with the respective load sensing port 81, so that pressurized fluid is not trapped in the load sensing circuit when the valving 29 returns to the neutral position. Preferably, each of the drain ports 99 is intersected by the reference plane RP and is positioned to provide the maximum possible flow area between the load sensing port 81 and drain port 99 in the neutral position.

Referring still to FIGS. 2 and 3, it may be seen that, on the outer surface of the valve spool 71, there is a pressure passage 101L disposed adjacent each of the load sensing ports 81, and in fluid communication with the adjacent passage 93L. Similarly, there is a pressure passage 101R disposed adjacent each of the load sensing ports 81 and in fluid communication with the adjacent passage 93R. As is seen in FIG. 2, in the neutral position, the load sensing port 81 is blocked from fluid communication with either of the pressure passages 101L or 101R, thus requiring that the circumferential spacing therebetween is at least equal to the diameter of the load sensing port 81. Preferably each of the pressure passages 101L and 101R extends axially beyond the reference plane RP to insure full communication with the load sensing port 81, in the appropriate turn position.

OPERATION

Referring now to FIGS. 4 and 5, a brief description will be given of the operation of the valving 29 in a right turn position, it being understood that, for a left turn, the sequence is substantially identical, but opposite. In the valve overlay view of FIG. 4, the valve spool 71 is being rotated by the turning of the steering wheel at a rate which maintains a relative rotational displacement of about 8 degrees between the valve spool 71 and the valve sleeve 73.

With pressurized fluid from the fluid inlet port 21 entering the pressure ports 83L and 83R, it may be seen that the pressure ports 83R are in communication only with the outer surface of the valve spool 71, thus providing a form of "closed center" relationship. However, each of the pressure ports 83L is in fluid communication with the adjacent passage 93L in a manner which defines a flow area 105 therebetween. It is the flow areas 105 which determine the flow rate of fluid passing from the fluid inlet port 21 and out the appropriate fluid port, in this case, the right fluid port R. It will also be appreciated that the variable orifice 35, shown schematically in FIG. 1 is, in fact, the summation of the individual flow areas 105.

Fluid passing through each of the flow areas 105 enters the passage 93L, then the circumferential meter groove 91L, flows out the meter ports 85L to the fluid meter 31, and returns from the meter 31 through the meter ports 85R, and into the meter groove 91R. From there, the fluid enters the operating passages 95R, flows out the respective operating port 87R to the right fluid port R, and from there by means of the fluid conduit 19 to the steering cylinder 15. Return fluid from the steering cylinder 15, displaced from the left end, passes through fluid conduit 17 to the left fluid port L, and from there, through the operating ports 87L and through their respective tank ports 97L and to tank as previously described.

When the steering wheel is rotated at a rate sufficient to maintain a large enough relative displacement between the valve spool 71 and valve sleeve 73 (in the subject embodiment, about 4 degrees) to initiate steering, the load sensing ports 81 are moved out of fluid communication with the drain ports 99 and into fluid communication with the respective pressure passage 101L. When this occurs, the pressure in the passages 93L, downstream of the flow areas 105, is transmitted through the pressure passages 101L, then through the load sensing ports 81 to the load signal port 25. Therefore, changes in the steering load (i.e., the fluid pressure required in the steering cylinder 15 to turn the wheels) will be reflected by changes in the fluid pressure downstream of the flow areas 105, with such changes being communicated back to the load signal port 25, and eventually back to the pilot operated flow control valve 39, in a manner previously described, to control the flow of fluid to the fluid inlet port 21, thereby maintaining a substantially constant pressure drop across the flow areas 105 (the variable orifice 35).

It should be appreciated that for a left turn, the pressure ports 83R would be in fluid communication with the adjacent passage 93R to define a flow area therebetween, while the load sensing ports 81 would be in fluid communication with the adjacent pressure passage 101R to transmit back to the load signal port 25 a pressure signal representative of the steering load as sensed downstream of the flow area defined by the pressure ports 83R and passages 93R, in the manner just described for a right turn.

Several points should be noted in connection with the turn positions of the valving of the present invention, as illustrated in FIG. 4. First, not only are the flow paths symmetrical and therefore, "balanced" with regard to both path length and path flow restriction, but also, the metered and non-metered fluids are maintained axially separated. This is an important feature because internal leakage between metered and non-metered fluid greatly detracts from steering precision, and may result in the undesirable condition known as "travel-limit slip". Secondly, it should be noted that the highest fluid pressures contained within the valving 29 are found nearest the central reference plane RP with the next highest pressure (i.e., downstream of the flow areas 105) upstream and downstream of the fluid meter 31 being disposed further from the reference plane RP, and finally, the lowest pressure, the fluid in the operating ports going to and returning from the cylinder, being disposed the furthest from the reference plane RP. Thus, this step-wise drop in the fluid pressure moving axially away from the reference plane RP in either direction, is also significant in reducing internal leakage within the valving 29.

I claim:

1. A controller for fluid pressure operated devices, said controller comprising:
   a. a housing;
   b. valve means disposed in said housing including a primary, rotatable valve member and a cooperating, relatively rotatable follow-up valve member, said valve members defining a neutral position relative to each other and having generally coincidental axes of rotation;
   c. means coupling said follow-up valve member to said primary valve member for limited movement relative to said neutral position and for common rotary movement therewith;
   d. a fluid meter including a metering member movable to measure the volume of fluid which passes therethrough;
   e. means coupling said metering member to said follow-up valve member for imparting follow-up movement thereto responsive to movement of said metering member;
   f. said controller including an inlet port, an outlet port, first and second control fluid ports for connection to a fluid pressure operated device, and a load sensing port for connection to a means operable to vary the fluid pressure at said inlet port;
   g. said primary and follow-up valve members cooperating with said housing to define a first fluid passage connecting said inlet port in fluid communication with said first control fluid port when said valve members are relatively displaced in one direction from the neutral position, said first fluid passage including said fluid meter;
   h. said primary and follow-up valve members cooperating with said housing to define a second fluid passage connecting said inlet port in fluid communication with said second control fluid port when said valve members are relatively displaced in the other direction from the neutral position, said second fluid passage including said fluid meter;
   i. said first and second fluid passages being constructed and arranged to provide substantially the same restriction to fluid flow between said inlet port and said first and second control fluid ports, respectively, for the same relative displacement of said valve members from the neutral position in said one and the other directions, respectively; and
   j. said follow-up valve member and said housing cooperating to define a load sensing passage in continuous fluid communication with said load sensing port and disposed to communicate with said first fluid passage when said valve members are relatively displaced in said one direction and with said second fluid passage when said valve members are relatively displaced in said other direction.

2. A controller as claimed in claim 1 wherein said valve members define one variable orifice and another variable orifice during relative displacement of said valve members in said one and said other directions, respectively, from the neutral position, said one and said another variable orifices being disposed in said first and second fluid passages, respectively, to control the rate of fluid flow therethrough.

3. A controller as claimed in claim 2 wherein said load sensing passage communicates with said first fluid passage downstream of said one variable orifice when said valve members are relatively displaced in said one direction and communicates with said second fluid passage downstream of said another variable orifice when said valve members are relatively displaced in said other direction.

4. A controller as claimed in claim 1 wherein said valve members define a central reference plane oriented generally perpendicular to said axes of rotation, and said first and second fluid passages are oppositely and approximately equally disposed about said central reference plane.

5. A controller as claimed in claim 4 wherein said load sensing passage includes an opening defined by said follow-up valve member, said central reference plane passing through said opening.

6. A controller as claimed in claim 5 wherein said first and second fluid passages include, respectively, first and second pressure ports and first and second meter ports defined by said follow-up valve member and first and second supply passages defined by said primary valve member, said first and second supply passages communicating between said first and second pressure ports and said first and second meter ports, respectively.

7. A controller as claimed in claim 6 wherein said opening is disposed to communicate with said first supply passage when said valve members are relatively displaced in said one direction and with said second supply passage when said valve members are relatively displaced in said other direction.

8. A controller as claimed in claim 7 wherein said first and second supply passages include first and second passage portions, respectively, each of said first and second passage portions being intersected by said central reference plane.

9. A controller as claimed in claim 8 wherein said first and second passage portions are spaced apart circumferentially by a distance at least equal to the circumferential dimension of said load sensing opening, said opening being disposed between said first and second passage portions and blocked from fluid communication therewith when said valve members are in the neutral position.

10. A controller for fluid pressure operated devices, said controller comprising:
   a. a housing:
   b. valve means disposed in said housing including a primary, rotatable valve member and a cooperating, relatively rotatable follow-up valve member, said valve members defining a neutral position relative to each other and having generally coincidental axes of rotation;
   c. means coupling said follow-up valve member to said primary valve member for limited movement relative to said neutral position and for common rotary movement therewith;
   d. a fluid meter including a metering member movable to measure the volume of fluid which passes therethrough;
   e. means coupling said metering member to said follow-up valve member for imparting follow-up movement thereto responsive to movement of said metering member;
   f. said controller including an inlet port, an outlet port, first and second control fluid ports for connection to a fluid pressure operated device, and a load sensing port for connection to a means operable to vary the fluid pressure at said inlet port;

g. said primary and follow-up valve members cooperating with said housing to define a first plurality of fluid passages connecting said inlet port in fluid communication with said first control fluid port when said valve members are relatively displaced in one direction from the neutral position, said first plurality of fluid passages including said fluid meter;

h. said primary and follow-up valve members cooperating with said housing to define a second plurality of fluid passages connecting said inlet port in fluid communication with said second control fluid port when said valve members are relatively displaced in the other direction from the neutral position, said second plurality of fluid passages including said fluid meter;

i. said first and second pluralities of fluid passages being oppositely and approximately equally disposed about a central reference plane oriented generally perpendicular to said axes of rotation; and j. said follow-up valve member and said housing cooperating to define a load sensing passage in continuous fluid communication with said load sensing port and disposed to communicate with said first plurality of fluid passages when said valve members are relatively displaced in said one direction and to communicate with said second plurality of fluid passages when said valve members are relatively displaced in said other direction.

11. A controller as claimed in claim 10 wherein each of said first and second pluralities of fluid passages includes a plurality of variable orifices defined by said primary and follow-up valve members during relative displacement thereof from the neutral position, said plurality of variable orifices in said first plurality of fluid passages being operable to control the rate of fluid flow through said controller when said valve members are relatively displaced in said one direction from the neutral position and said plurality of variable orifices in said second plurality of fluid passages being operable to control the rate of fluid flow through said controller when said valve members are relatively displaced in said other direction from the neutral position.

12. A controller as claimed in claim 11 wherein said load sensing passage communicates with at least one of said first plurality of fluid passages downstream of its respective variable orifice when said valve members are relatively displaced in said one direction and communicates with at least one of said second plurality of fluid passages downstream of its respective variable orifice when said valve members are relatively displaced in said other direction.

13. A controller as claimed in claim 10 wherein said load sensing passage includes a housing passage communicating with said load sensing port and an opening defined by said follow-up valve member.

14. A controller as claimed in claim 13 wherein said central reference plane passes through said load sensing opening in said follow-up valve member and each of said first and second pluralities of fluid passages including a pressure port defined by said follow-up valve member and communicating with said inlet port, a meter port, defined by said follow-up valve member and communicating with said fluid meter and a supply passage defined by said primary valve member and communicating between said pressure port and said meter port.

15. A controller as claimed in claim 14 wherein said load sensing opening in said follow-up valve member communicates with one of said supply passages of said first plurality of fluid passages when said valve members are relatively displaced in said one direction from the neutral position, and communicates with one of said supply passages of said second plurality of fluid passages when said valve members are relatively displaced in said other direction from the neutral position.

16. A controller as claimed in claim 15 wherein said supply passages of said first and second pluralities of fluid passages disposed to communicate with said load sensing opening include, respectively, first and second passage portions, each of said first and second passage portions extending a sufficient distance toward said central reference plane to communicate with said load sensing opening when said valve members are relatively displaced from the neutral position in said one direction and said other direction, respectively.

17. A controller as claimed in claim 16 wherein said load sensing opening is disposed between said first and second passage portions and blocked from fluid communication therewith when said valve members are in the neutral position, said first and second passage portions being spaced apart circumferentially by a distance slightly greater than the circumferential dimension of said load sensing opening.

18. A controller as claimed in claim 17 wherein said primary valve member defines a drain passage communicating with said outlet port and communicating with said load sensing opening when said valve members are in the neutral position, said drain passage being disposed to be blocked from fluid communication with said load sensing opening when said valve members are relatively displaced from the neutral position by a predetermined rotational deflection in either direction.

19. A controller as claimed in claim 14 wherein said pressure ports of said first and second pluralities of fluid passages are arranged in substantially a mirror image of each other about said central reference plane and said supply passages of said first and second pluralities of fluid passages are arranged in substantially a mirror image of each other, over at least a major portion thereof, about said central reference plane.

* * * * *